(12) United States Patent
Zilavy et al.

(10) Patent No.: US 7,725,892 B2
(45) Date of Patent: May 25, 2010

(54) FIELD-REPLACEABLE UNIT REVISION COMPATIBILITY

(75) Inventors: Daniel V. Zilavy, Fort Collins, CO (US); Gerald J. Kaufman, Jr., Fort Collins, CO (US); Edward A. Cross, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1070 days.

(21) Appl. No.: 10/610,657

(22) Filed: Jul. 1, 2003

(65) Prior Publication Data
US 2005/0005268 A1   Jan. 6, 2005

(51) Int. Cl.
G06F 9/44   (2006.01)
(52) U.S. Cl. ............... 717/170; 717/169; 717/171
(58) Field of Classification Search ............... 717/169, 717/170
See application file for complete search history.

(56) References Cited

U.S. PATENT DOCUMENTS

| | | | |
|---|---|---|---|
| 5,623,604 A | 4/1997 | Russell et al. | |
| 5,727,215 A | 3/1998 | Rynaski et al. | |
| 5,812,857 A | 9/1998 | Nelson et al. | |
| 5,937,198 A | 8/1999 | Nelson et al. | |
| 6,237,091 B1 | 5/2001 | Firooz et al. | |
| 6,266,809 B1 | 7/2001 | Craig et al. | |
| 6,272,678 B1 * | 8/2001 | Imachi et al. | 717/122 |
| 6,360,362 B1 | 3/2002 | Fichtner et al. | |
| 6,467,088 B1 * | 10/2002 | alSafadi et al. | 717/173 |
| 6,473,899 B1 | 10/2002 | Nelson et al. | |
| 6,477,611 B1 | 11/2002 | Chang | |
| 6,477,629 B1 | 11/2002 | Goshey et al. | |
| 6,532,535 B1 | 3/2003 | Maffezzoni et al. | |
| 6,898,768 B1 | 5/2005 | Theodossy et al. | |
| 6,948,059 B1 * | 9/2005 | Sprecher et al. | 713/100 |
| 2002/0052910 A1 | 5/2002 | Bennett | |
| 2003/0014470 A1 | 1/2003 | Iijima | |
| 2003/0140134 A1 | 7/2003 | Swanson et al. | |

(Continued)

FOREIGN PATENT DOCUMENTS

EP   0275448 A   7/1988

(Continued)

OTHER PUBLICATIONS

"ESCORT: a decentralized and localized access control system for mobile wireless access to secured domains", Kong et al., Septermber 2003, pp. 51-60. Online retrieved at <http://delivery.acm.org/10.1145/950000/941320/p51-kong.pdf>.*

(Continued)

*Primary Examiner*—Tuan Q Dam
*Assistant Examiner*—Thuy Dao

(57) ABSTRACT

A method for use in a computer system includes a first revision compatibility descriptor identifying a first plurality of compatible combinations of field-programmable unit codes. The method includes steps of: (A) determining whether the first revision compatibility descriptor identifies first field-programmable unit code for use in a first field-programmable unit as being compatible with the computer system; and (B) if the first revision compatibility descriptor does not identify the first field-programmable unit code as being compatible with the computer system, performing a step of updating the first revision compatibility descriptor to identify the first field-programmable unit code as being compatible with the computer system.

25 Claims, 12 Drawing Sheets

U.S. PATENT DOCUMENTS

2004/0199899 A1* 10/2004 Powers et al. ............... 717/120
2005/0132346 A1* 6/2005 Tsantilis ..................... 717/168

FOREIGN PATENT DOCUMENTS

| EP | 0535600 | A1 | 9/1992 |
| EP | 0860778 | A1 | 8/1998 |
| EP | 1335283 | A | 8/2003 |

OTHER PUBLICATIONS

"Upgrading transport protocols using untrusted mobile code", Patel et al., Dec. 2003, pp. 1-14. Online retrieved at <http://delivery.acm.org/10.1145/950000/945447/p1-patel.pdf>.*

"Version control in the Inscape environment", D. Perry, Mar. 1987, pp. 142-149. Online retrieved at <http://delivery.acm.org/10.1145/50000/41780/p142-perry.pdf>.*

"A multi-version data model for executing real-time transactions in a mobile environment", Lam et al., May 2001, pp. 90-97, <http://delivery.acm.org/10.1145/380000/376911/p90-lam.pdf>.*

France Search Report dated Dec. 2, 2005.

* cited by examiner

| RECIPE # | FPU ID | | | | FRU ID | | | | CURRENT RECIPE? |
|---|---|---|---|---|---|---|---|---|---|
| | A | B | C | D | A | B | C | D | |
| 0 | 0 | 0 | 0 | 1 | 0 | 1 | 0 | 1 | N |
| 1 | 0 | 0 | 0 | 2 | 0 | 1 | 1 | 3 | N |
| 2 | 0 | 1 | 0 | 1 | 2 | 1 | 2 | 2 | Y |
| 3 | 0 | 1 | 2 | 2 | 3 | 0 | 3 | 1 | N |
| 4 | 1 | 0 | 3 | 1 | 1 | 1 | 0 | 3 | N |
| 5 | 1 | 1 | 3 | 2 | 2 | 1 | 0 | 2 | N |
| 6 | 2 | 0 | 0 | 1 | 3 | 3 | 1 | 2 | N |
| 7 | 2 | 0 | 3 | 2 | 0 | 0 | 3 | 3 | N |

FIG. 2A

| RECIPE # | FPU ID | | | | FRU-ID | | | | CURRENT RECIPE? |
|---|---|---|---|---|---|---|---|---|---|
| | A | B | C | D | A | B | C | D | |
| 0 | 0 | 0 | 0 | 1 | 0 | 1 | 0 | 1 | N |
| 1 | 0 | 0 | 0 | 2 | 0 | 1 | 1 | 3 | N |
| 2 | 0 | 1 | 0 | 1 | 2 | 1 | 2 | 2 | Y |
| 3 | 0 | 1 | 2 | 2 | 3 | 0 | 3 | 1 | N |
| 4 | 1 | 0 | 3 | 1 | 1 | 1 | 0 | 3 | N |
| 5 | 1 | 1 | 3 | 2 | 2 | 1 | 0 | 2 | N |
| 6 | 2 | 0 | 0 | 1 | 3 | 3 | 1 | 2 | N |
| 7 | 2 | 0 | 3 | 2 | 0 | 0 | 3 | 3 | N |
| 8 | 3 | 0 | 3 | 2 | 0 | 0 | 3 | 3 | N |

FIELD-REPLACEABLE UNIT REVISION COMPATIBILITY

CROSS REFERENCE TO RELATED APPLICATIONS

This application is related to a commonly-owned and concurrently-filed U.S. patent application entitled "Field-Replaceable Unit Revision Compatibility," Ser. No. 10/611,558, which is hereby incorporated by reference.

BACKGROUND

1. Field of the Invention

The present invention relates to computer systems that include field-replaceable units (FRUs).

2. Related Art

Every computer includes both hardware and software. The hardware of a computer includes electromechanical components such as microprocessors, buses, input/output (I/O) controllers, memory, and mass storage devices (such as hard disk drives). It can be difficult to maintain and repair such components, particularly as they become more and more complex and miniaturized. Increasingly, it is not feasible to attempt to perform an electrical or mechanical repair on a component such as a bus or I/O controller. Rather, often the best that a technician faced with a malfunctioning computer can do is to identify the component that is the source of the problem and to physically replace the identified component with a new component. Such a repair process can be tedious, time-consuming, and costly because it requires a human technician to diagnose the cause of the malfunction, open the computer housing, physically remove (and possibly dispose of) the malfunctioning component, and physically install the new component. Although the process of diagnosing computer malfunctions is becoming increasingly automated, the component replacement process must still be performed manually.

In early computer systems it was often difficult or impossible to replace certain hardware components—such as the central processing unit (CPU), memory, and I/O controllers—after the computer had been manufactured. Such components might, for example, be hardwired together, in which case attempting to remove any of such components might irreversible damage the computer. In some cases, it might be possible to remove such components by breaking and reestablishing physical connections by soldering or using some other tedious and time-consuming process requiring a skilled technician to perform.

Computer hardware designers are increasingly designing computer systems so that components (such as the CPU, memory, and I/O controllers) can be replaced easily in the field (i.e., at user locations). A component that can be easily removed from a computer and replaced with a new component in the field is referred to as a "field-replaceable unit" (FRU). Modern computers increasingly include modular hardware interfaces which allow FRUs to be removed easily by a relatively unskilled technician. Removing an FRU may, for example, only require removing a few screws and pulling the FRU out of the computer. The same technician may then install a replacement FRU with the same ease. Although the use of FRUs decreases the difficulty, cost, and time required to replace a hardware component, field-replacement of FRUs still requires a human technician to remove and replace the defective FRU.

Software, in contrast, is embodied in the form of electromagnetic signals stored in a mass storage device (e.g., a hard disk drive) or other form of electronic memory. It has therefore traditionally been possible to replace or update faulty or outdated software merely by erasing the old software and replacing it with new software provided on a tangible storage medium, such as a floppy diskette or CD-ROM. Updating or replacing software, therefore, traditionally has been significantly easier and less costly to perform than hardware replacement. The widespread use of computer networks and the Internet has further simplified the process of updating software by making it possible to download software over a network and install it—in some cases without any human intervention—without the need to distribute the software on a physical medium such as a floppy diskette.

There is now a trend in computer hardware design to implement various hardware components in ways that make it possible for hardware to be updated and effectively replaced in a manner that is similar to the manner in which it traditionally has been possible to update and replace software. The term "field-programmable unit" (FPU) refers to a hardware component whose functionality may be modified by electronically programming it. Examples of FPUs include system firmware (e.g., BIOS), embedded enclosure process firmware, and Field-Programmable Gate Arrays (FPGAs). Each of these kinds of FPUs is capable of storing electrical signals representing code that dictates, in whole or in part, the functions performed by the FPU. The functionality of an FPU, therefore, may be modified merely by modifying the code (in the form of electrical signals) stored in the FPU.

It may be necessary or desirable to re-program an FPU in any of a variety of circumstances. For example, the code stored in an FPU may become out-of-date, in which case it may be desirable to update the code in the FPU to enable it to perform new functions. As another example, the code stored in a newly-installed FPU may be incompatible with other hardware in the system, in which case it may be necessary to update the FPU's code with code that is compatible with the other hardware in the system. The code in an FPU may also become corrupted, in which case it may be necessary to re-load fresh code into the FPU to restore it to a functional state.

In all of these cases, the primary advantage of the FPU over conventional forms of hardware is that the FPU may be repaired or effectively replaced merely by storing new code in the FPU. New code may be stored in an FPU using a process that is similar to the process by which software is updated. For example, a human technician may provide the code to the computer using a floppy diskette or by downloading the code over a network. The technician may then instruct the computer to store the new code in the FPU, a process which may typically be performed quickly and without requiring the technician to open the computer housing or perform any physical modifications to the computer. Repairing an FPU can therefore be significantly less tedious, time-consuming and expensive than repairing a conventional hardware component.

Although an FRU (field-replaceable unit) need not be field-programmable, an FRU may include one or more FPUs (field-programmable units). An FRU may therefore be field-programmable as well as field-replaceable. In a particular computer system, it is possible for the FPU code stored in an FRU to be incompatible with other FPU code in the system or with hardware components of the system. Such incompatibilities may cause the system to malfunction. It is desirable to avoid such incompatibilities to maintain proper system function.

SUMMARY

A computer system may include one or more field-replaceable units (FRUs), each of which may include one or more field-programmable units (FPUs). Each FPU may include code that may be modified. The computer system may include a revision compatibility matrix (RCM) that indicates which combinations of FRUs and FPU codes are compatible with each other. When code in an FPU is updated, a compatibility check performed using the RCM may incorrectly indicate that the updated code is not compatible with the computer system. Techniques are disclosed for automatically updating the RCM when code in an FPU is updated. In particular, techniques are disclosed for packaging updated FPU code and a corresponding updated RCM in a single update package which may be used to update both the FPU code and the RCM, thereby avoiding an erroneous determination that the updated FPU code is incompatible with the system.

Although certain embodiments of the present invention will now be described in terms of method steps, such steps may be implemented as computer program instructions tangibly embodied in a computer-readable medium. For example, in one embodiment of the present invention, a method is provided for use in a computer system including a first revision compatibility descriptor identifying a first plurality of compatible combinations of field-programmable unit codes. The method includes steps of (A) determining whether the first revision compatibility descriptor identifies first field-programmable unit code for use in a first field-programmable unit as being compatible with the computer system; and (B) if the first revision compatibility descriptor does not identify the first field-programmable unit code as being compatible with the computer system, performing a step of updating the first revision compatibility descriptor to identify the first field-programmable unit code as being compatible with the computer system, such as by updating the first revision compatibility descriptor to include a first compatible combination of field-programmable unit codes that includes the first field-programmable unit code. The first field-programmable unit may also be field-replaceable.

The step (B) may include steps of: (B) (1) identifying a second revision compatibility descriptor identifying a second plurality of compatible combinations of field-programmable unit codes including the first field-programmable unit code; and (B) (2) replacing the first revision compatibility descriptor with the second revision compatibility descriptor.

The computer system may further include a plurality of field-programmable units including a corresponding plurality of field-programmable unit codes, and the step (A) of the method may include a step of determining that the first field-programmable unit code is compatible with the computer system if a combination of the first field-programmable unit code and the plurality of field-programmable unit codes is among the plurality of compatible combinations of field-programmable unit codes identified by the first revision compatibility descriptor.

The method may further include a step of: (C) obtaining an update package including the first field-programmable unit code and update code specifying a first compatible combination of field-programmable unit codes including the first field-programmable unit code, and the step of updating the first revision compatibility descriptor may include a step of updating the first revision compatibility descriptor based on the update code in the update package. The update code may include a second revision compatibility descriptor identifying a second plurality of compatible combinations of field-programmable unit codes including the first-field programmable unit code, and the step (B) may include a step of replacing the first revision compatibility descriptor with the second revision compatibility descriptor.

In another embodiment of the present invention, a method is provided for use in a computer system including a first revision compatibility descriptor identifying a first plurality of compatible combinations of field-programmable unit codes. The method includes steps of: (A) receiving an update package comprising first field-programmable unit code suitable for use in a first field-programmable unit and update code specifying a first compatible combination of field-programmable unit codes including the first field-programmable unit code; and (B) updating the first revision compatibility descriptor to include the first compatible combination of field-programmable unit codes.

The first revision compatibility descriptor may be associated with a first revision time and the update code may be associated with a second revision time. The method may further include steps of: (C) prior to the step (B), determining whether the second revision time is more recent than the first revision time; and (D) performing the step (B) only if it is determined in the step (C) that the second revision time is more recent than the first revision time. The method may further include a step of (E) determining whether the first field-programmable unit code is compatible with the computer system by reference to the updated first revision compatibility descriptor.

Other features and advantages of various aspects and embodiments of the present invention will become apparent from the following description and from the claims.

BRIEF DESCRIPTION OF THE DRAWINGS

As described in more detail below, the methods illustrated in the drawings by flowcharts may be implemented by computer programs.

FIG. 2A is a diagram of a first revision compatibility matrix according to one embodiment of the present invention;

FIG. 2B is a diagram of a second revision compatibility matrix according to one embodiment of the present invention;

DETAILED DESCRIPTION

A computer system may include one or more field-replaceable units (FRUs), each of which may include one or more field-programmable units (FPUs). Each FPU may include code that may be modified. The computer system may include a revision compatibility matrix (RCM) that indicates which combinations of FRUs and FPU codes are compatible with each other. When code in an FPU is updated, a compatibility check performed using the RCM may incorrectly indicate that the updated code is not compatible with the computer system. Techniques are disclosed for automatically updating the RCM when code in an FPU is updated. In particular, techniques are disclosed for packaging updated FPU code and a corresponding updated RCM in a single update package which may be used to update both the FPU code and the RCM, thereby avoiding an erroneous determination that the updated FPU code is incompatible with the system.

Figure 1A:
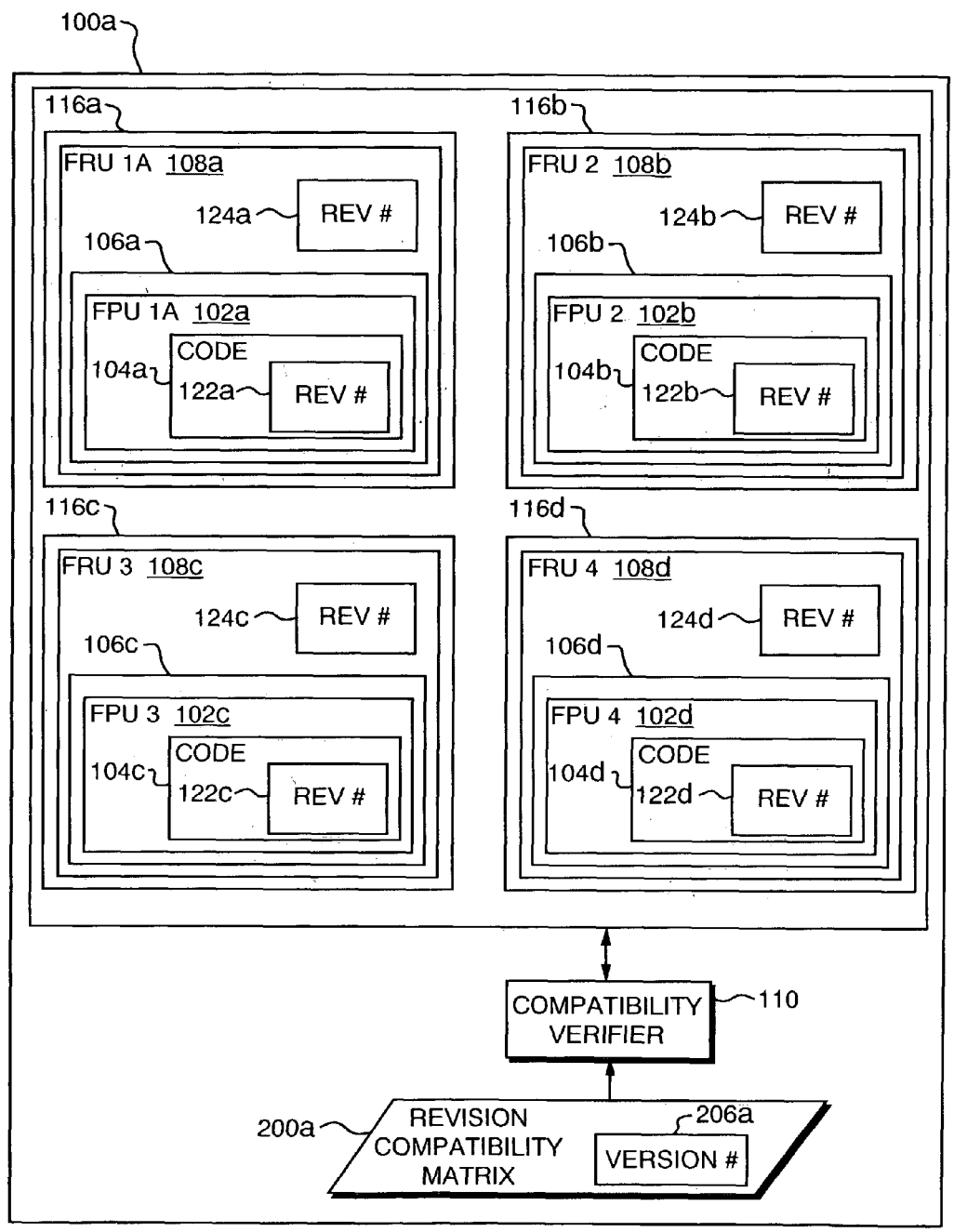
FIG. 1A is a functional block diagram of a computer system prior to the installation of a new FRU according to one embodiment of the present invention.

Referring to FIG. 1A, a functional block diagram is shown of a computer system 100a in which various embodiments of the present invention may be applied. The computer system 100a may, for example, be a desktop computer, laptop computer, workstation, mainframe, or any other kind of computer system. Although the computer system 100a includes at least one processor, main memory, a system bus, and the other components commonly included in a computer system, such components are not shown in FIG. 1A for ease of illustration. Rather, only those elements that are relevant to the discussion of the method 100 are shown in FIG. 1A.

In particular, the computer system 100a includes four field-replaceable units (FRUs) 108a-d. FRUs 108a-d may, for example, be implemented as printed circuit assemblies (PCAs). FRUs 108a-d include revision numbers 124a-d, respectively. In the embodiment illustrated in FIG. 1A, each of the revision numbers 124a-d represents a hardware revision number of the corresponding FRU. The revision numbers 124a-d may, for example, be stored in serial EEPROMs on the PCAs that implement the FRUs 108a-d.

FRUs 108a-d are installed in FRU slots 116a-d, respectively. The FRU slots 116a-d need not be "slots," but rather may more generally include any kind of connective circuitry or other components for connecting the FRUs 108a-d, respectively, to the system 100a.

FRUs 108a-d include field-programmable units (FPUs) 102a-d, respectively. Field-programmable units 102a-d include field programmable unit code 104a-d, respectively. Code 104a-d includes revision numbers 122a-d, respectively. As described in more detail below, each of the revision numbers 122a-d represents a revision number of the corresponding code 104a-d.

Figure 1B:
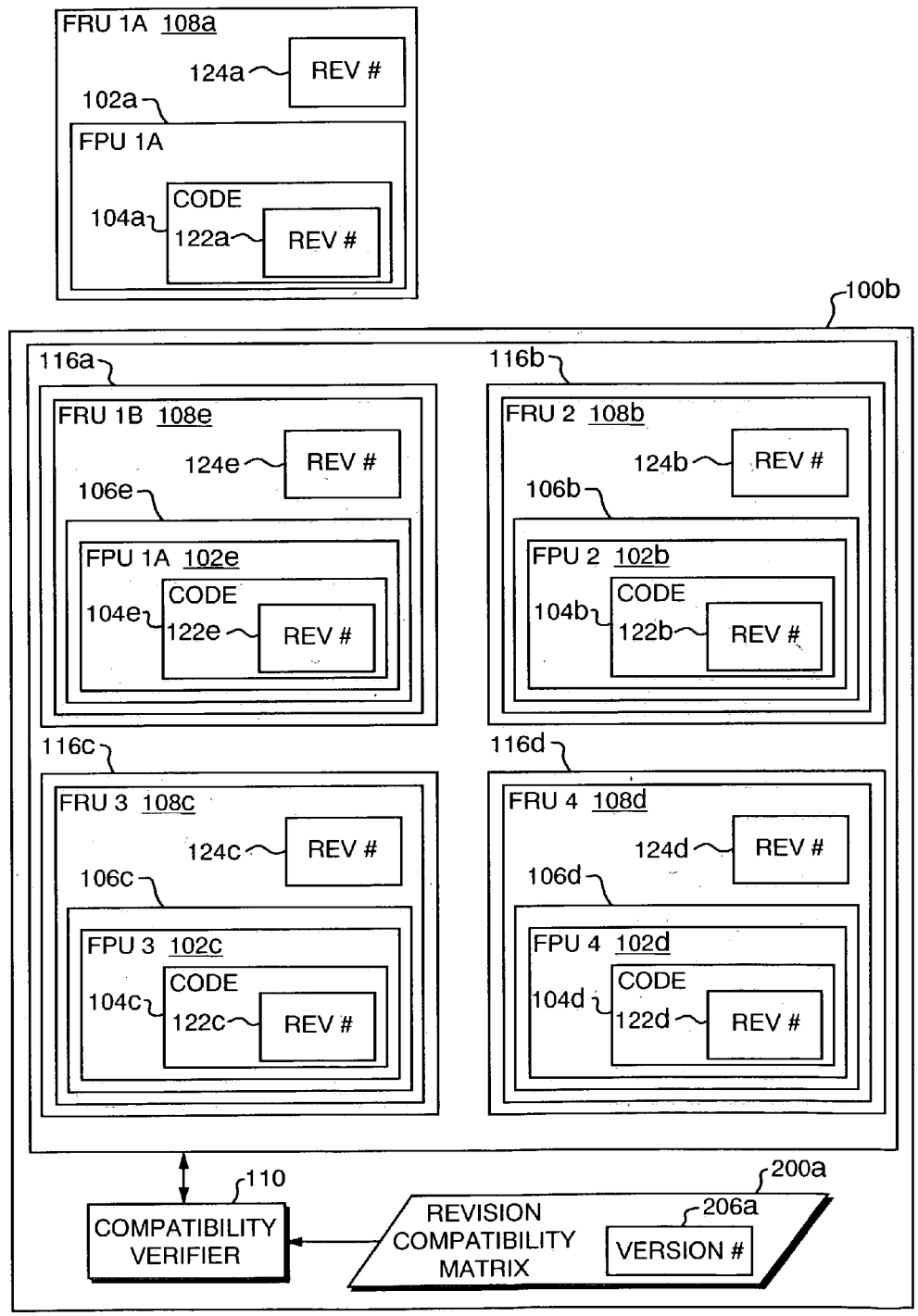
FIG. 1B is a functional block diagram of the computer system of FIG. 1B after the installation of a new FRU according to one embodiment of the present invention.

FPUs 102a-d may be any kind of FPUs, such as system firmware, embedded enclosure processor firmware, or FPGAs. FPUs 102a-d are installed in FPU slots 106a-d, respectively. Like the FRU slots 116a-d, the FPU slots 106a-d may include any kind of connective circuitry or other components for connecting the FPUs 102a-d to the FRUs 108a-d, respectively. In the embodiment illustrated in FIGS. 1A-1B, each of the slots 106a-d is designed to receive an FPU of a particular type. For example, slot 106a may be designed to receive firmware implementing the system BIOS, while slot 101B may be designed to receive an FPGA implementing a particular I/O controller.

Although four FRUs 108a-d, four FPUs 102a-d, and corresponding slots 116a-d and 106a-d are shown in FIG. 1A for purposes of example, the system 100a may include any number and kind of FRU and FPU in any combination. In particular, an FRU may include, zero, one, or more FPUs.

It is common for the first revision (also referred to as a "release") of an FRU or FPU code to have a revision number of 1 (or 1.0), and for subsequent revisions to have higher revision numbers (such as 1.1 for a minor release and 2.0 for a major release). Different revisions of code for the same FPU may, for example, include code that fixes bugs from previous revisions or that adds additional features to the FPU.

The term "field-programmable unit code" (FPU code) refers to a set of code intended for use in a field-programmable unit. For example, codes 104a-d are all field-programmable unit codes. A particular combination of FRUs and field-programmable unit codes that may be installed in a computer system is referred to herein as a "recipe." For example, the particular combination of FRUs 108a-d and FPU codes 104a-d installed in the system 100a is an example of a recipe. A particular recipe may, for example, be represented as a list of FRU revision numbers and FPU code revision numbers. The term "revision" is used herein to refer generally both to FRU revisions and to FPU code revisions.

The combination of FRU revisions and FPU code revisions represented by a particular recipe may or may not be compatible with each other. A recipe may, for example, specify a combination of codes which, if installed in the FPUs in slots 106a-d, will cause the computer system 100a to malfunction. A combination of FPU codes which, if installed in the FPUs in slots 106a-d, do not interfere with each other's operation are referred to herein as "mutually-compatible codes." It is desirable that only recipes including mutually-compatible FPU codes be installed in a computer system. More generally, a combination of FRU revisions and FPU code revisions which, if installed in a computer system, do not interfere with each other's operation are referred to herein as "mutually-compatible revisions." A recipe which specifies a combination of mutually-compatible revisions is referred to herein as a "compatible recipe."

The system 100 also includes a revision compatibility matrix 200a which specifies compatible recipes suitable for use in the computer system 100a. The revision compatibility matrix 200a may, for example, be generated by installing and testing various combinations of FRU revisions and FPU code revisions in computer system 100a, identifying combinations of revisions that are mutually compatible, and recording the identified combinations of mutually-compatible revisions in the revision compatibility matrix 200a.

Referring to FIG. 2A, an example of the revision compatibility matrix 200a is shown according to one embodiment of the present invention. The revision compatibility matrix 200a shown in FIG. 2A includes eight rows (records) 202a-h, each of which specifies a particular compatible recipe suitable for use in the computer system 100a. Revision compatibility matrix 200a includes: (1) columns 204a-d, corresponding to FPU slots 106a-d, respectively; (2) columns 204e-h, corresponding to FRU slots 116a-d, respectively; and (3) column 204i, which indicates the most-recently recognized recipe installed in the system 100a.

Each of the FPU slots 106a-d is referred to by a particular FPU identifier (FPU ID) shown at the tops of columns 204a-d. In particular, FPU slots 106a-d are referred to by the FPU IDs A, B, C, and D, respectively, in FIG. 2A (as indicated by the parenthetical reference numerals below columns 204a-d). Similarly, each of the FRU slots 116a-d is referred to by a particular FRU identifier (FRU ID) shown at the tops of columns 204e-h (as indicated by the parenthetical reference numerals below columns 204e-h).

Each row of the revision compatibility matrix 200a specifies a particular compatible recipe as a set of FPU code revision numbers and FRU revision numbers. For example, row 202h specifies a recipe in which: (1) code revision 2 is stored in the FPU in slot 106a; (2) code revision 0 is stored in the FPU in slot 106b; (3) code revision 3 is stored in the FPU in slot 106c; (4) code revision 2 is stored in the FPU in slot 106d; (5) an FRU having revision 0 is installed in FRU slot 116a; (6) an FRU having revision 0 is installed in FRU slot 116b; (7) an FRU having revision 3 is installed in FRU slot 116c; and (8) an FRU having revision 3 is installed in FRU slot 116d.

Note that in the present embodiment a particular set of FPU code may be identified by a combination of FPU ID and revision number. For example, the combination of FPU ID "A" and revision number "2" identifies FPU code for use in FPU slot 106a and having revision number 2. This particular scheme for identifying FPU code, however, is presented merely for purposes of example and does not constitute a limitation of the present invention. Other identification schemes may alternatively be used to identify particular FPU code in the revision compatibility matrix 200a. The same is true for FRU revision numbering.

Referring again to FIG. 1A, the revision compatibility matrix 200a includes a version number 206a. The version number 206a may indicate the version of the revision compatibility matrix 200a in any of a variety of ways, such as by indicating the date on which the revision compatibility matrix 200a was created or by indicating a revision number of the matrix 200a.

Now consider an example in which the FRU 108a is replaced. For example, referring to FIG. 1B, a computer system 100b is shown which is the same as computer system 100a except that FRU 108a has been replaced with an FRU 108e, which has a revision number 124e, and which includes an FPU 102e including code 104e having revision number 122e. The reference numeral 100 is used herein to refer generically to the computer systems 100a-h (FIGS. 1A-1H) when differences between the two are not relevant. As will be described in more detail below, the revision number 124e of replacement FRU 108e may be the same as or differ from the revision number 124a of the original FRU 108a, and the code 104e in replacement FPU 102e may be the same as or differ from the code 104a in original FPU 102a. The replacement of FRU 108a by FRU 108e will typically be performed by a human operator in response to the identification of a malfunction or other problem with original FRU 108a.

The system 100b also includes a compatibility verifier 110 that has access to FRUs 108b-e and that may attempt to determine whether the new FRU 102e, including the code 104e it contains, is compatible with the rest of the system 100b based on the information contained in the revision compatibility matrix 200a. Techniques for performing such a compatibility determination are described in more detail in the above-referenced patent application entitled "Field-Replaceable Unit Revision Compatibility Matrix." In brief overview, the compatibility verifier 110 determines whether any of the records 202a-h in the revision compatibility matrix 200a specify a combination of FRU revisions and FPU code revisions that match the combination of FRUs 108b-e and FPU codes 104b-e currently installed in the system 100b. If such a record is found, the new FRU 108e is determined to be compatible with the computer system 100; otherwise the new FRU 108e is determined not to be compatible with the computer system 100.

Figure 1C:
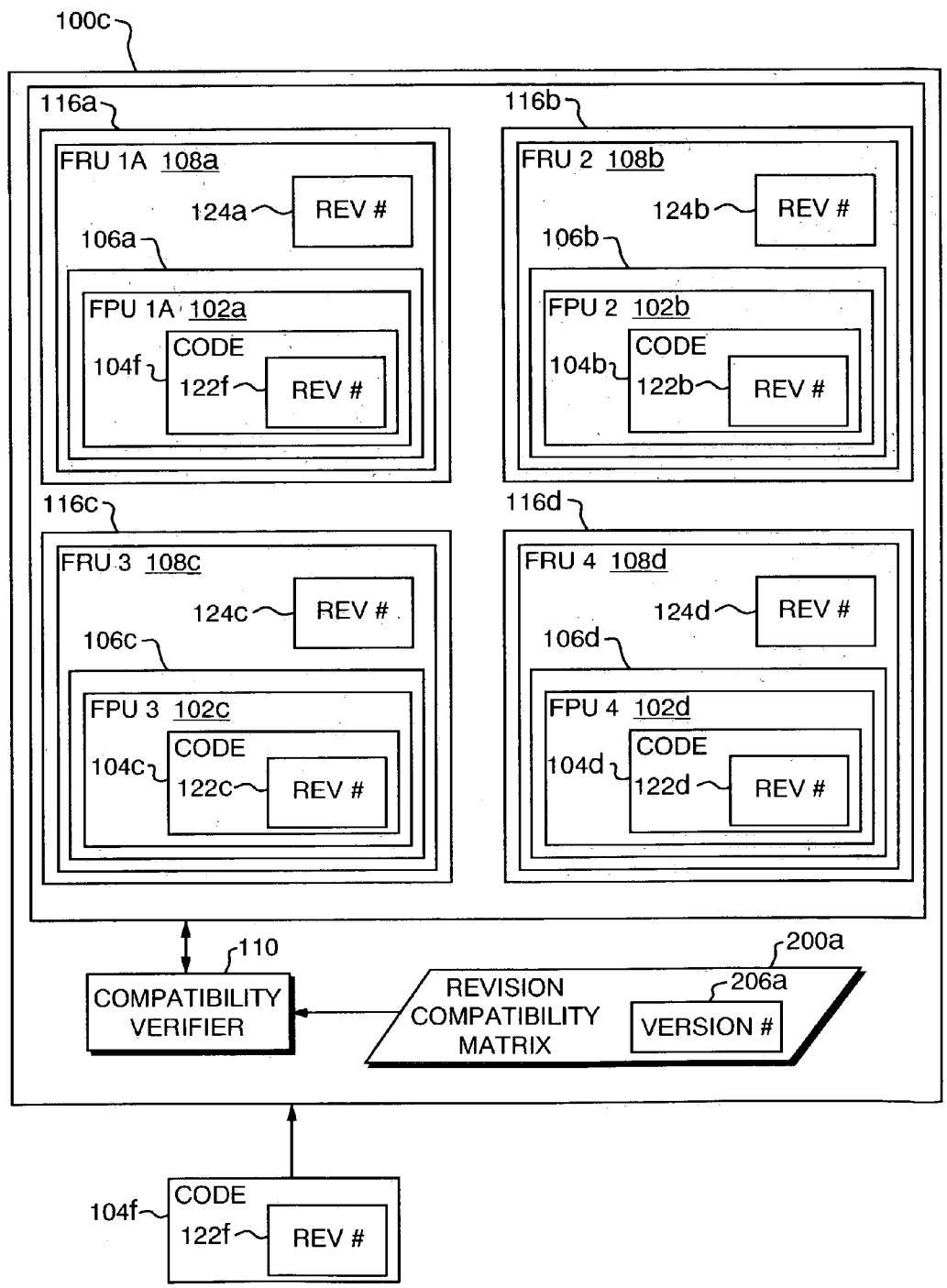
FIG. 1C is a functional block diagram of the computer system of FIG. 1A in which the code in one FPU has been replaced with new FPU code according to one embodiment of the present invention.

Referring to FIG. 1C, a computer system 100c is shown which is the same as computer system 100a except that the code 104a in FPU 102a has been replaced with code 104f having revision number 122f. As shown in FIG. 1C, the code 104f has been downloaded from a remote site and installed in the FPU 102a.

Assume for purposes of example that the code 104f is in fact compatible with the FRUs 108a-d and with the FPU codes 102b-d installed in the system, but that the revision compatibility matrix 200a does not include any records indicating that the code 104f is compatible with the system.

If the techniques disclosed above are used to determine whether the new code 104f is compatible with the rest of the system 100c, the compatibility verifier 110 will (incorrectly) determine that the new code 104f is incompatible with the rest of the system 100c. The compatibility verifier 110 will produce the wrong result because it bases its determination on the information in the revision compatibility matrix 200a which, in the present example, is not up-to-date. Examples of techniques will now be disclosed for updating the contents of the revision compatibility matrix 200a to contain information about the compatibility of the new code 104f with other components in the system 100c.

Figure 1D:
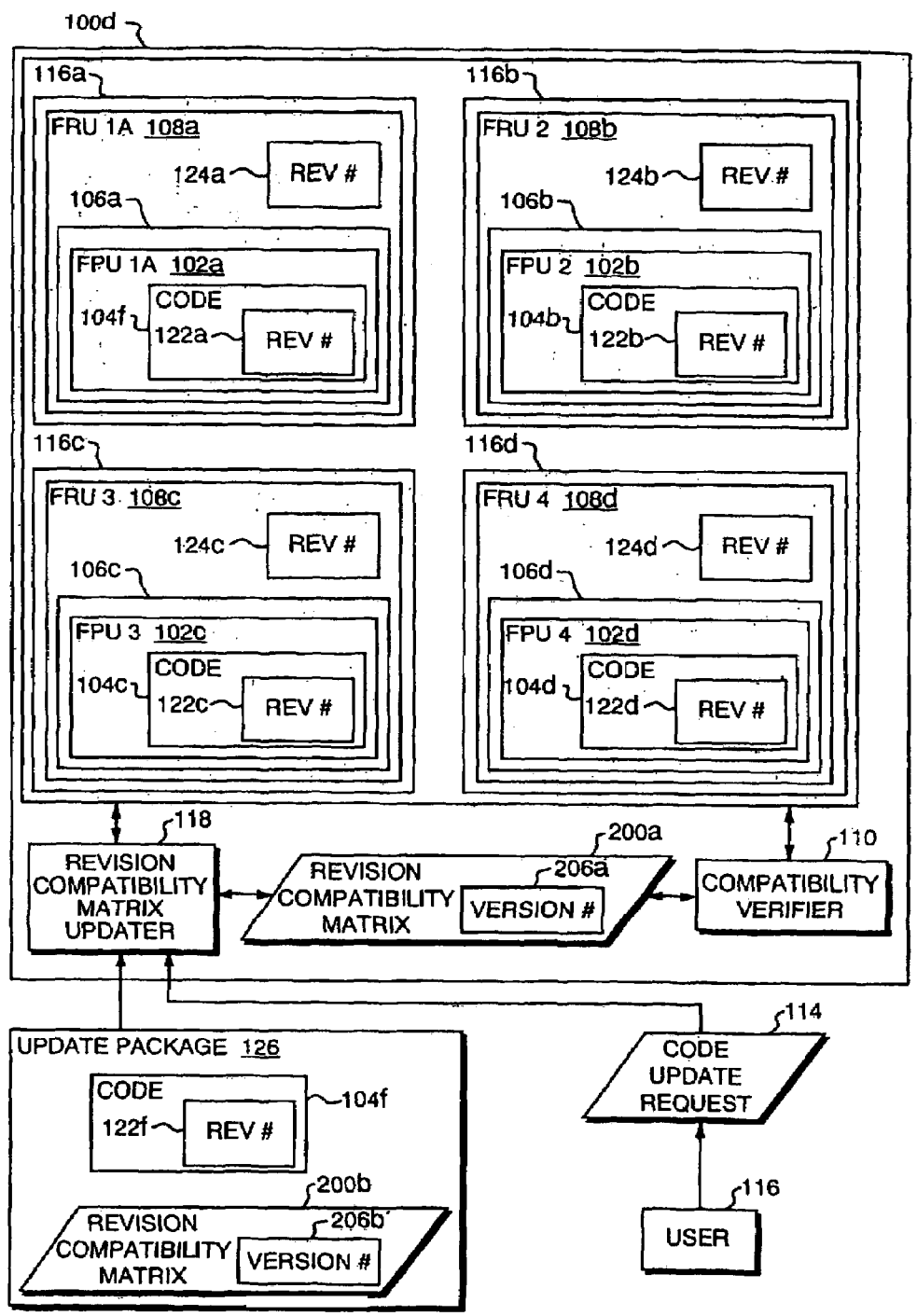
FIG. 1D is a functional block diagram of the computer system of FIG. 1A prior to the installation of update code from an update package according to one embodiment of the present invention.
Figure 3:
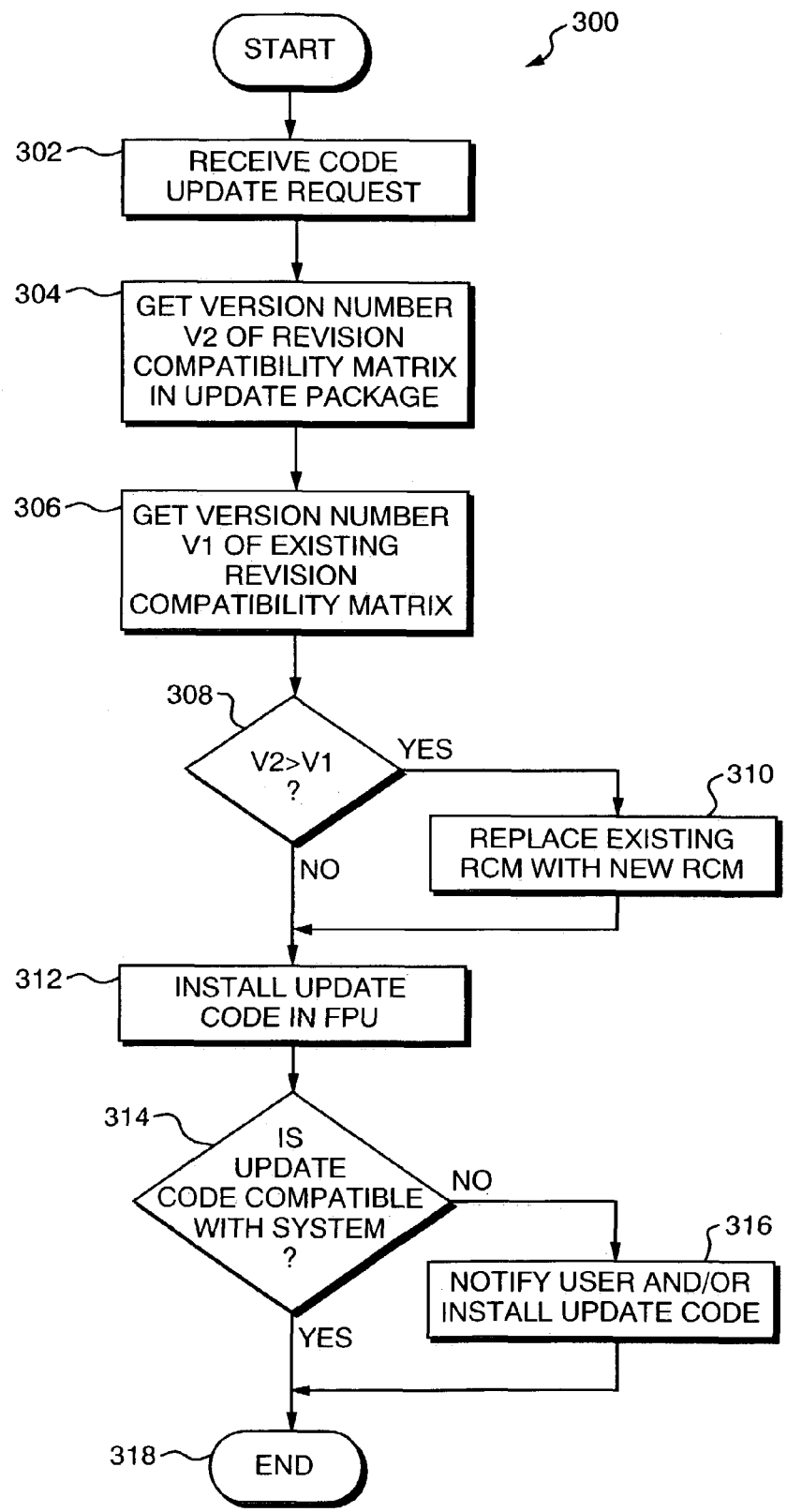
FIG. 3 is a flowchart of a method that is used in one embodiment of the present invention to update the revision compatibility matrix of FIG. 2A.

Referring to FIG. 3, a flowchart is shown of a method 300 that is used in one embodiment of the present invention to update the revision compatibility matrix 200a to include information about the compatibility of the new code 104f with other components in the system 100c. Referring to FIG. 1D, a computer system 100d is shown which is similar to the computer systems 100a and 100c (FIG. 1C). Note, however, that in FIG. 1D the new code 104f has not yet been installed in the FPU 102a, and that an update package 126 includes both the new code 104f and a new revision compatibility matrix 200b including its own revision number 206b. The revision compatibility matrix 200b includes compatibility information about the new code 104f. Note that although revision compatibility matrix 200b may be referred to herein as a "new" revision compatibility matrix 200b, this does not necessarily imply that it was created more recently than revision compatibility matrix 200a, but rather merely that revision compatibility matrix 200b is newly introduced into the computer system 100. The same is true of the "new" code 104f, which is also referred to herein as "update code."

Referring to FIG. 2B, an example of the contents of revision compatibility matrix 200b is shown according to one embodiment of the present invention. In the example shown in FIG. 2B, the new revision compatibility matrix 200b has the same contents as the existing revision compatibility matrix 200a except that the new revision compatibility matrix 200b includes an additional record 212i listing an additional compatible recipe. Assume that in the present example the revision number 122f of the update code 104f is equal to 3. Note that the value of column 214a (corresponding to FPU slot 106a) in record 212i is equal to 3. The record 212i therefore indicates a particular combination of FPU code revisions and FRU revisions with which the update code 104f is compatible.

Note that the system 100*d* also includes a revision compatibility matrix updater 118. The revision compatibility matrix updater 118 is responsible for updating the revision compatibility matrix 200*a* based on the contents of the update package 126 and for installing the code 104*f* in the FPU 102*a*. The revision compatibility matrix updater 118 may perform some or all of method 300.

The method 300 receives a code update request 114 from, for example, a user 116 of the system 100*d* (step 302). Although the user 116 may make the request 114 explicitly, the request 114 may also be generated implicitly when the user 116 attempts to install the new code 114*f*. The matrix updater 118 may, for example, be executed on a management processor which may perform the remaining steps of method 300 automatically in response to the user's attempt to install the code 104*f*.

The method 300 obtains the version number 206*b* of the revision compatibility matrix 200*b* in the update package 126 (step 304) and the version number 206*a* of the existing revision compatibility matrix 200*a* in the computer system 100*d* (step 306).

The method 300 determines, based on the new version number 206*b* and the old version number 206*a*, whether the new revision compatibility matrix 200*b* is more recent than the existing revision compatibility matrix 200*a* (step 308). As described above, the version numbers 206*a*-*b* may take any of a variety of forms, such as revision numbers (e.g., 1.0, 1.1, 2.0) or dates. A higher revision number or later date may be interpreted by the method 300 to mean a more recent version.

Figure 1E:
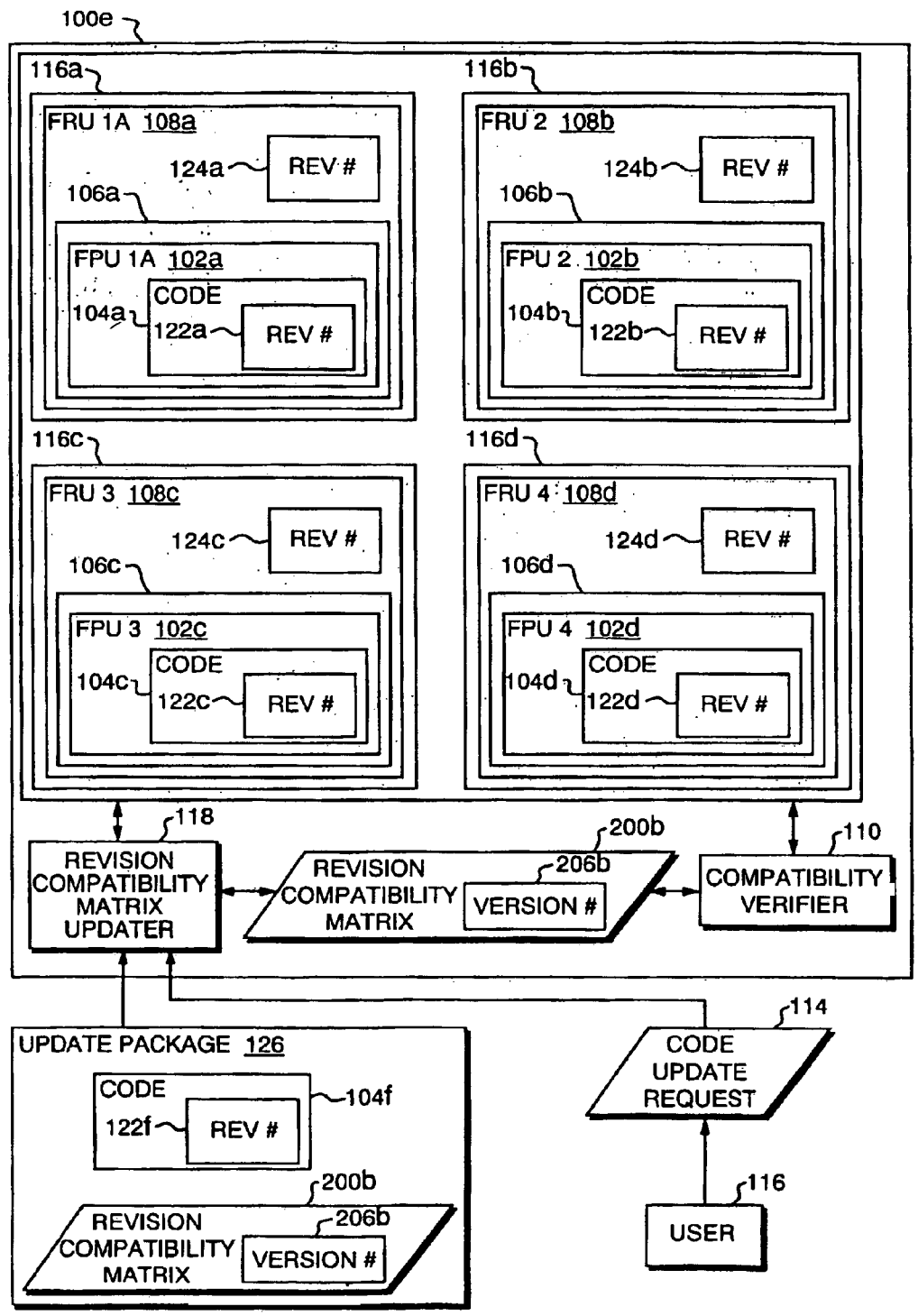
FIG. 1E is a functional block diagram of the computer system of FIG. 1D after replacement of a first revision compatibility matrix by a second revision compatibility matrix according to one embodiment of the present invention.

If the method 300 determines that the new revision compatibility matrix 200*b* is more recent than the existing revision compatibility matrix 200*a*, the method 300 replaces the revision compatibility matrix 200*a* with the revision compatibility matrix 200*b* (step 310). Referring to FIG. 1E, a computer system 100*e* is shown which is the same as the computer system of 100*d* except that the first revision compatibility matrix 200*a* has been replaced with the second revision compatibility matrix 200*b* by the revision compatibility matrix updater 118 in step 310. As described in more detail below, the revision compatibility matrix 200*a* may be updated in other ways which do not require replacing the entire revision compatibility matrix 200*a*.

Figure 1F:
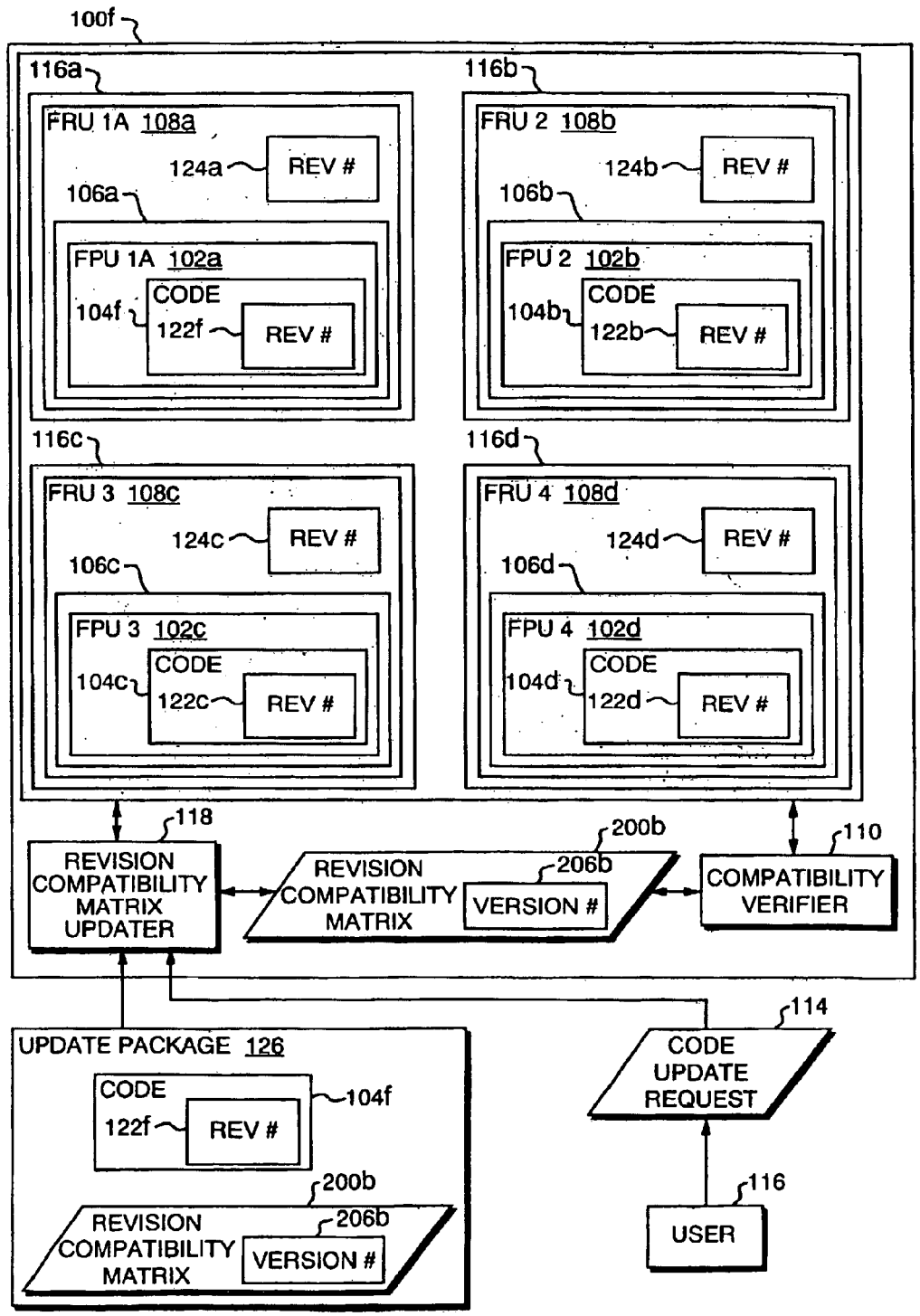
FIG. 1F is a functional block diagram of the computer system of FIG. 1E after replacement of code in an FPU by new FPU code according to one embodiment of the present invention.

The method 300 installs the code 104*f* in the FPU 102*a* (step 312). Referring to FIG. 1F, a computer system 100*f* is shown which is the same as the computer system 100*e* except that the code 104*a* has been replaced with the update code 104*f* by the method 300 in step 312.

The method 300 determines whether the newly-installed code 104*f* is compatible with the FRUs 108*a*-*d* and other code 104*b*-*d* in the system 104*f*, based on the information contained in the newly-installed revision compatibility matrix 200*b* (step 314). Note that even though the second revision compatibility matrix 200*b* includes compatibility information for the newly-installed code 104*f*, it may be the case that such compatibility information indicates that the code 104*f* is not compatible with the rest of the system 100*f*.

If the method 300 determines that the newly-installed code 104*f* is compatible with the rest of the system 100*f*, the method 300 terminates (step 318). If the method 300 determines that the newly-installed code 104*f* is not compatible with the rest of the system 100*f*, the method 300 may notify the user 116 of the incompatibility, identify and inform the user 116 of code that may be installed in the FPU 102*a* to make it compatible with the rest of the system 100*f*, and/or automatically install such compatible code in the FPU 102*a* (step 316). The method 300 may then terminate. Techniques that may be used to implement steps 314 and 316 are described in more detail in the above-referenced patent application entitled "Field-Replaceable Unit Revision Compatibility Matrix," and are therefore not described in detail herein.

Note that the code compatibility check performed in step 314 may alternatively be performed prior to step 304. If such a compatibility check determines that the code 104*f* is compatible with the system 100*f*, the remainder of method 300 need not be performed.

Figure 1G:
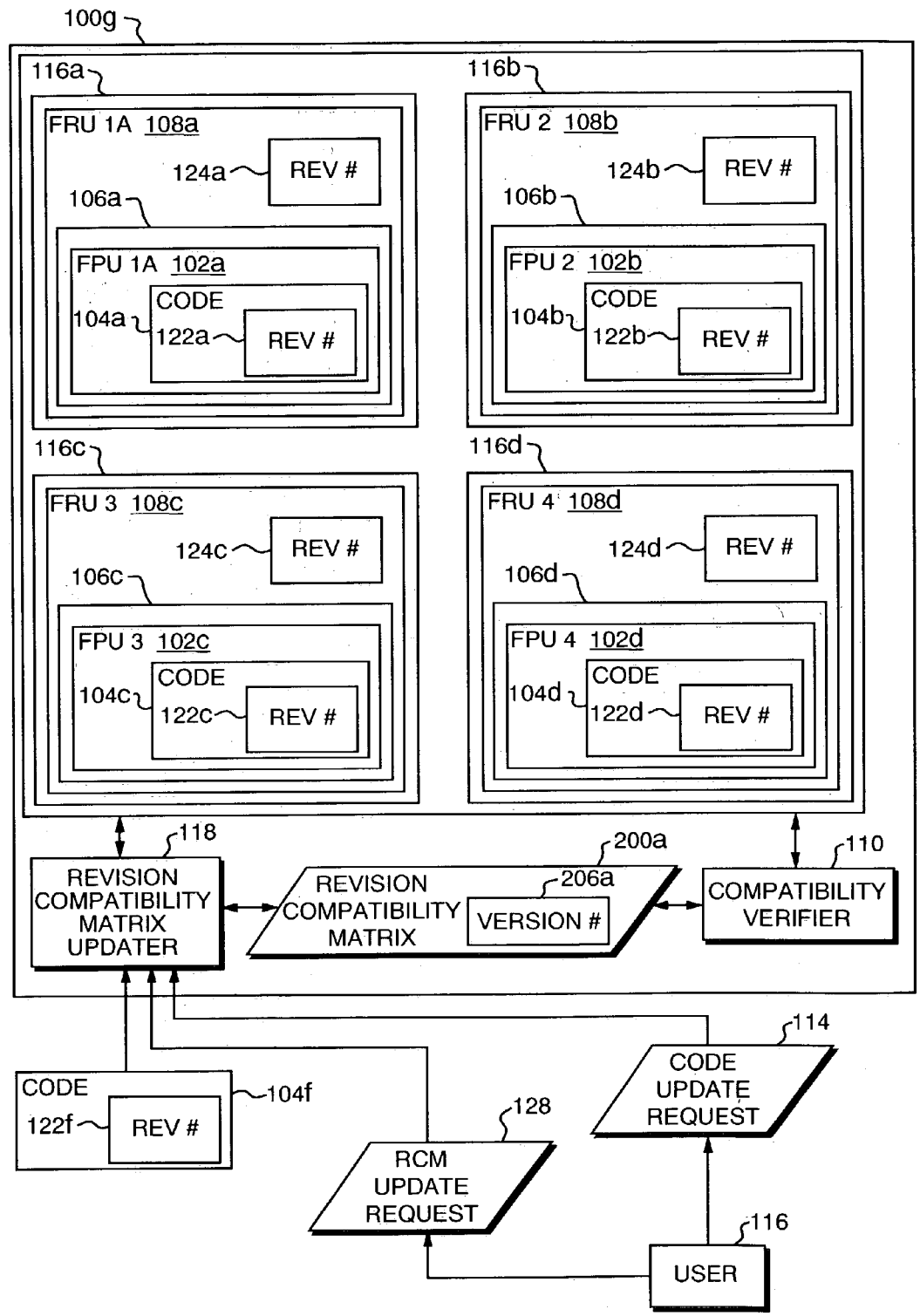
FIG. 1G is a functional block diagram of the computer system of FIG. 1A prior to updating a revision compatibility matrix in the computer system according to one embodiment of the present invention.
Figure 4:
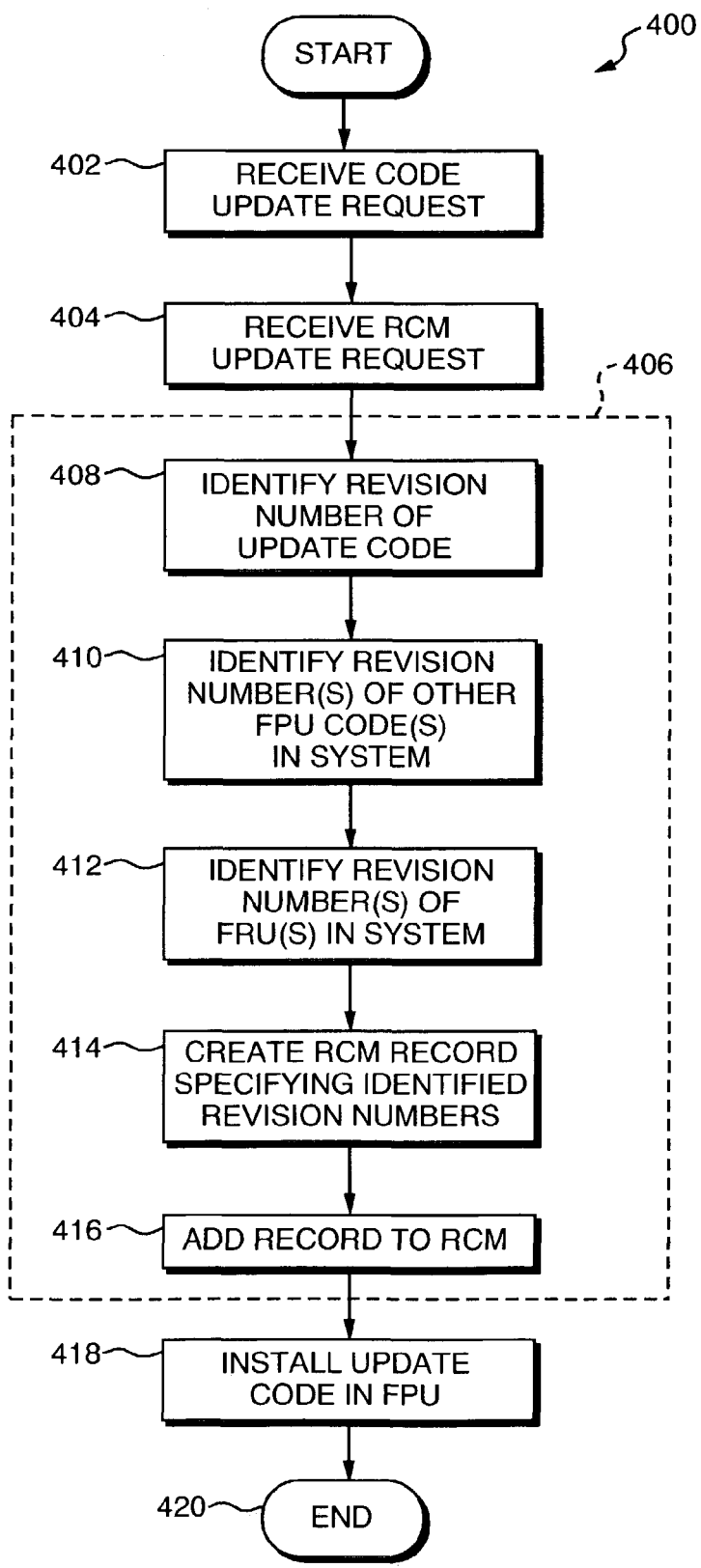
FIG. 4 is a flowchart of a method that is used in another embodiment of the present invention to update the revision compatibility matrix of FIG. 2A.

Referring to FIG. 4, a flowchart is shown of a method 400 that is used in one embodiment of the present invention to update the revision compatibility matrix 200*a* to include information indicating that the update code 104*f* is compatible with other components in the system 100. Such a method may be useful when, for example, the user 116 has independent knowledge that the code 104*f* is compatible with the components of the system 100, but in which there is no available revision compatibility matrix indicating as such. Referring to FIG. 1G, a computer system 100*g* is shown in which the method 400 may be used. Note that in the example shown in FIG. 1G the update code 104*f* is provided to the system 100*g* independently of a revision compatibility matrix.

The method 400 receives code update request 114 (step 402) in the manner described above with respect to step 302 of method 300 (FIG. 3). The method 400 receives a revision compatibility matrix update request 128 (step 404). The revision compatibility matrix updater 118 may, for example, provide the user 116 with a user interface (not shown) which allows the user 116 to provide the revision compatibility matrix update request 128 by indicating that the user 116 knows that the code 104*f* is compatible with the system 100*g* and that the revision compatibility matrix 200*a* should be updated to reflect this fact.

Optionally, the method 400 may first determine whether the code 104*f* is compatible with the system 100*g* (by using, for example, the techniques described above with respect to step 314 of method 300) before prompting the user 116 for the revision compatibility matrix update request 128. If such a compatibility check determines that the code 104*f* is compatible with the system 100*g*, the revision compatibility matrix update request 128 need not be received and subsequent steps of the method 400 need not be performed.

If the user 116 provides the revision compatibility update request 128, the method 400 updates the revision compatibility matrix 200*a* to indicate that the update code 104*f* is compatible with the computer system 100*h* (step 406). Examples of particular techniques that may be used to perform step 406 will now be described.

The method 400 obtains the revision number 122*f* of the update code 104*f* (step 408). Assume for purposes of the present example that the revision number 122*f* is 3. The method 400 also obtains the revision numbers of the other FPU codes 104*b*-*d* in the system 100*g* (step 410) and the revision numbers of the FRUs 108*a*-*d* in the system 100*g* (step 412). Assume for purposes of the present example that the FPU code revision numbers 122*b*-*d* are as shown in columns 214*b*-*d*, respectively, of record 212*h* (FIG. 2A), and that the FRU revision numbers 124*a*-*d* are as shown in columns 214*e*-*h*, respectively, of record 212*h*.

The method 400 updates the revision compatibility matrix 200*a* to indicate that the code 104*f* is compatible with the other components of the system 100*g* by creating a new revision compatibility matrix record 130 (FIG. 1H) that specifies the revision numbers obtained in steps 406-410 (step 414) and adding this record 130 to the revision compatibility matrix 200*a* (step 416). Based on the example values of the revision numbers 122*f*, 122*b-d*, and 124*a-d* described above, the contents of the record 130 would be the same as the contents of record 212*i* shown in FIG. 2B. In the present example, therefore, the contents of the revision compatibility matrix 200*a* with the added record 130 would be the same as the contents of the revision compatibility matrix 200*b* shown in FIG. 2B.

Figure 1H:
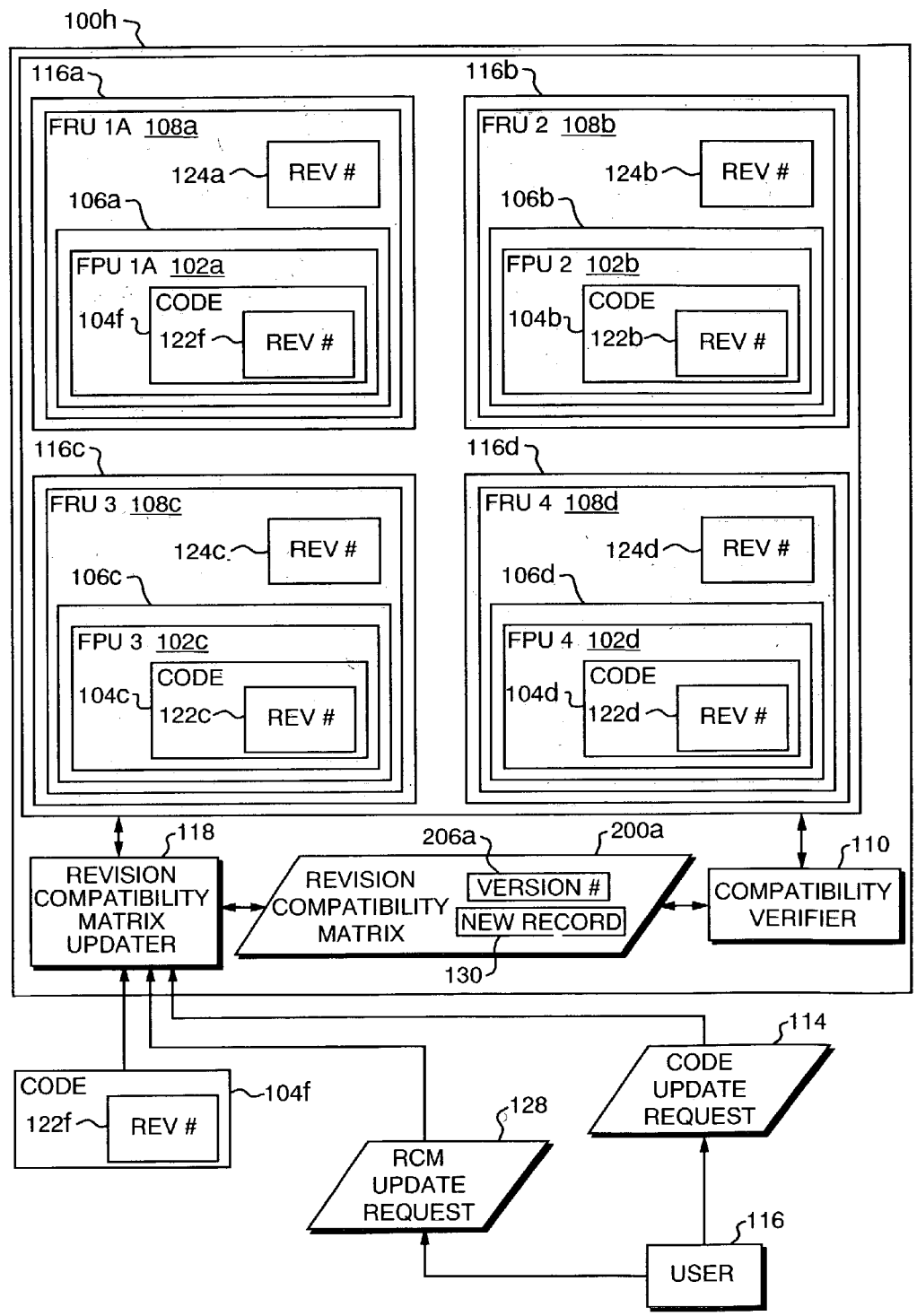
FIG. 1H is a functional block diagram of the computer system of FIG. 1G after the revision compatibility matrix has been updated according to one embodiment of the present invention.

As a result, the revision compatibility matrix 200*a* indicates that the update code 104*f* is compatible with the system 100*g*. The method 400 installs the update code 104*f* in the FPU 102*a* (step 418) and terminates (step 420). Referring to FIG. 1H, a computer system 100*h* is shown illustrating the result of the method 400.

Among the advantages of the invention are one or more of the following.

For the reasons described above, a computer system with automatic FRU compatibility-checking features may falsely indicate that newly-installed FPU code is incompatible with the computer system. One advantage of the techniques disclosed herein is that they may be used to enable FPU code to be updated in such a computer system without causing the computer system to falsely indicate that the updated FPU code is incompatible with the computer system. This enables FPU code to be updated easily and efficiently and without confusing the system operator with false error messages.

Furthermore, providing the revision compatibility matrix update information and the update code in a single update package (as shown in FIGS. 1D-1F) enables the process of updating the revision compatibility matrix 200*a* to be further simplified and automated. For example, one advantage of such an integrated update package is that it eliminates any need for the user 116 to separately identify and/or obtain revision compatibility matrix update information corresponding to the update code 104*f*. Rather, the user 116 may simply identify/download the update package 126 and issue the code update request 114 to the revision compatibility matrix updater 118. The revision compatibility matrix updater 118 may then install the code 104*f* in the FPU 102*a* and update the compatibility matrix 200*a* using the information contained in the update package 126 without further intervention by the user 116.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions.

Although the revision compatibility matrices 200*a-b* are illustrated in FIGS. 2A-2B as two-dimensional matrices, this is not a limitation of the present invention. Rather the revision compatibility matrices 200*a-b* may be implemented in the form of any appropriate data structure and may therefore be considered more generally to be "revision compatibility descriptors" that describe the compatibility of various FPU codes with each other. For example, although the particular revision compatibility matrices 200*a-b* shown in FIGS. 2A-2B lists complete sets of mutually-compatible FRUs and FPU codes, the revision compatibility matrices 200*a-b* may, for example, indicate pairs, triplets, or other combinations of mutually-compatible FRUs and FPU codes that do not specify a complete recipe.

Although the particular embodiments of the revision compatibility matrices 200*a-b* shown in FIGS. 2A-2B use integral revision numbers to identify FRUs and FPU codes, this is not a limitation of the present invention. Rather, any kind of identifying information may be used to specify particular FRUs and FPU codes and to determine whether two particular instances of FRUs or FPU codes are the same or differ from each other. For example, the bits in sets of FPU code may be compared directly to each other to determine whether they are the same, thereby eliminating the need to use separate revision numbers or other identifying information.

The revision compatibility matrices 200*a-b* may or may not be stored permanently in the computer system 100. For example, the revision compatibility matrices 200*a-b* may be downloadable from a remote location into the computer system 100 using techniques that are well-known to those of ordinary skill in the art. The matrices 200*a-b* may be used to perform the functions disclosed herein and deleted when no longer needed.

Computer systems suitable for use in embodiments of the present invention may include any number of FPUs and/or FRUs in any combination. An FRU may include zero or more FPUs. Furthermore, although the FPUs 102*a-e* illustrated in FIGS. 1A-1H are shown as distinct sub-components of the FRUs 108*a-e*, respectively, this is not a requirement of the present invention. Rather, an FRU may itself be an FPU which contains its own code.

The second revision compatibility matrix 200*b* need not be a complete revision compatibility matrix specifying all compatible combinations of FRU revisions and FPU code revisions. Rather, the second revision compatibility matrix 200*b* may, for example, include only records specifying the compatibility of the update code 104*f* with various FRU revisions and FPU code revisions. In such a case, the revision compatibility matrix 200*b* in the update package 126 may be merged with or appended to the existing revision compatibility matrix 200*a*, rather than used to replace the existing revision compatibility matrix 200*a*.

The techniques described above (e.g., the revision compatibility matrix updater 118, the revision compatibility matrices 200*a-b*, and the compatibility verifier 110) may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a computer system including a first revision compatibility descriptor identifying a first plurality of compatible combinations of field-programmable unit codes, a computer-implemented method comprising steps of:
   (A) determining whether the first revision compatibility descriptor identifies first field-programmable unit (FPU) code, for use in a first field-programmable unit of a first type, as being compatible with second FPU code, for use in a second FPU of a second type, different from the first type, in the computer system;
   (B) if the first revision compatibility descriptor does not identify the first field-programmable unit code as being compatible with the second FPU code in the computer system, performing a step of updating the first revision compatibility descriptor to identify the first field-programmable unit code as being compatible with the second FPU code in the computer system.

2. The method of claim 1, wherein the step (B) comprises a step of updating the first revision compatibility descriptor to identify a first compatible combination of field-programmable unit codes that includes the first field-programmable unit code.

3. The method of claim 1, wherein the step (B) comprises steps of:
   (B)(1) identifying a second revision compatibility descriptor identifying a second plurality of compatible combinations of field-programmable unit codes including the first field-programmable unit code; and
   (B)(2) replacing the first revision compatibility descriptor with the second revision compatibility descriptor.

4. The method of claim 1, wherein the computer system further comprises a plurality of field-programmable units including a corresponding plurality of field-programmable unit codes, and wherein the step (A) comprises a step of determining that the first field-programmable unit code is compatible with the computer system if a combination of the first field-programmable unit code and the plurality of field-programmable unit codes is among the plurality of compatible combinations of field-programmable unit codes identified by the first revision compatibility descriptor.

5. The method of claim 1, wherein the first field-programmable unit comprises a field-replaceable unit.

6. The method of claim 1, further comprising a step of:
   (A) obtaining an update package including the first field-programmable unit code and update code specifying a first compatible combination of field-programmable unit codes including the first field-programmable unit code;

wherein the step of updating the first revision compatibility descriptor comprises a step of updating the first revision compatibility descriptor based on the update code in the update package.

7. The method of claim 6, wherein the update code comprises a second revision compatibility descriptor identifying a second plurality of compatible combinations of field-programmable unit codes including the first-field programmable unit code, and wherein the step (B) comprises a step of replacing the first revision compatibility descriptor with the second revision compatibility descriptor.

8. The method of claim 1, further comprising a step of:
   (C) installing the first field-programmable unit code in the first field-programmable unit.

9. In a computer system including a first revision compatibility descriptor identifying a first plurality of compatible combinations of field-programmable unit codes, a computer-implemented method comprising steps of:
   (A) determining whether the first revision compatibility descriptor identifies first field-programmable unit (FPU) code, for use in a first field-replaceable field-programmable unit of a first type, as being compatible with second FPU code, for use in a second FPU of a second type, different from the first type, in the computer system;
   (B) if the first revision compatibility descriptor does not identify the first field-programmable unit code as being compatible with the second FPU code in the computer system, performing steps of:
      (1) identifying an update package including the first field-programmable unit code and a second revision compatibility descriptor identifying a second plurality of compatible combinations of field-programmable unit codes including the first-field programmable unit code;
      (2) replacing the first revision compatibility descriptor with the second revision compatibility descriptor; and
   (C) installing the first field-programmable unit code in the first field-programmable unit.

10. In a computer system including a first revision compatibility descriptor identifying a first plurality of compatible combinations of field-programmable unit codes, a device comprising:
    determination means for determining whether the first revision compatibility descriptor identifies first field-programmable unit (FPU) code, for use in a first field-programmable unit of a first type, as being compatible with second FPU code, for use in a second FPU of a second type, different from the first type, in the computer system; and
    update means for updating the first revision compatibility descriptor to identify the first field-programmable unit code as being compatible with the second FPU code in the computer system if the first revision compatibility descriptor does not identify the first field-programmable unit code as being compatible with the second FPU code in the computer system.

11. The device of claim 10, wherein the update means comprises means for updating the first revision compatibility descriptor to identify a first compatible combination of field-programmable unit codes that includes the first field-programmable unit code.

12. The device of claim 10, wherein the update means comprises:
    means for identifying a second revision compatibility descriptor identifying a second plurality of compatible combinations of field-programmable unit codes including the first field-programmable unit code; and means for replacing the first revision compatibility descriptor with the second revision compatibility descriptor.

13. The device of claim 10, wherein the computer system further comprises a plurality of field-programmable units including a corresponding plurality of field-programmable unit codes, and wherein the determination means comprises means for determining that the first field-programmable unit code is compatible with the computer system if a combination of the first field-programmable unit code and the plurality of field-programmable unit codes is among the plurality of compatible combinations of field-programmable unit codes identified by the first revision compatibility descriptor.

14. The device of claim 10, wherein the first field-programmable unit comprises a field-replaceable unit.

15. The device of claim 10, further comprising:

means for obtaining an update package including the first field-programmable unit code and update code specifying a first compatible combination of field-programmable unit codes including the first field-programmable unit code; and wherein the update means comprises means for updating the first revision compatibility descriptor based on the update code in the update package.

16. The device of claim 15, wherein the update code comprises a second revision compatibility descriptor identifying a second plurality of compatible combinations of field-programmable unit codes including the first-field programmable unit code, and wherein the update means comprises means for replacing the first revision compatibility descriptor with the second revision compatibility descriptor.

17. The device of claim 10, further comprising:

means for installing the first field-programmable unit code in the first field-programmable unit.

18. A storage medium readable by a computer in a computer system including a first revision compatibility descriptor identifying a first plurality of compatible combinations of field-programmable unit codes, the storage medium tangibly embodying program instructions executable by the computer to perform method steps of:

(A) determining whether the first revision compatibility descriptor identifies first field-programmable unit (FPU) code, for use in a first field-programmable unit of a first type, as being compatible with second FPU code, for use in a second FPU of a second type, different from the first type, in the computer system; and (B) if the first revision compatibility descriptor does not identify the first field-programmable unit code as being compatible with second FPU code in the computer system, performing a step of updating the first revision compatibility descriptor to identify the first field-programmable unit code as being compatible with second FPU code in the computer system.

19. The storage medium of claim 18, wherein the step (B) comprises a step of updating the first revision compatibility descriptor to identify a first compatible combination of field-programmable unit codes that includes the first field-programmable unit code.

20. The storage medium of claim 18, wherein the step (B) comprises steps of:

(B)(1) identifying a second revision compatibility descriptor identifying a second plurality of compatible combinations of field-programmable unit codes including the first field-programmable unit code; and (B)(2) replacing the first revision compatibility descriptor with the second revision compatibility descriptor.

21. The storage medium of claim 18, wherein the computer system further comprises a plurality of field-programmable units including a corresponding plurality of field-programmable unit codes, and wherein the step (A) comprises a step of determining that the first field-programmable unit code is compatible with the computer system if a combination of the first field-programmable unit code and the plurality of field-programmable unit codes is among the plurality of compatible combinations of field-programmable unit codes identified by the first revision compatibility descriptor.

22. A computer system comprising:

a computer-readable medium tangibly embodying a first revision compatibility descriptor identifying a first plurality of compatible combinations of field-programmable unit codes;

a compatibility verifier coupled to the computer-readable medium and operable to determine whether the first revision compatibility descriptor identifies first field-programmable unit (FPU) code, for use in a first field-programmable unit of a first type, as being compatible with second FPU code, for use in a second FPU of a second type, different from the first type, in the computer system; and a compatibility descriptor updater coupled to the computer-readable medium and operable to update the first revision compatibility descriptor to identify the first field-programmable unit code as being compatible with the second FPU code in the computer system if the compatibility verifier determines that first revision compatibility descriptor does not identify the first field-programmable unit code as being compatible with the second FPU code in the computer system.

23. The computer system of claim 22, wherein the compatibility descriptor updater is operable to update the first revision compatibility descriptor to identify a first compatible combination of field-programmable unit codes that includes the first field-programmable unit code.

24. The computer system of claim 22, wherein the compatibility verifier is operable to identify a second revision compatibility descriptor identifying a second plurality of compatible combinations of field-programmable unit codes including the first field-programmable unit code, and wherein the compatibility descriptor updater is operable to replace the first revision compatibility descriptor with the second revision compatibility descriptor.

25. The computer system of claim 22, further comprising a plurality of field-programmable units including a corresponding plurality of field-programmable unit codes, and wherein the compatibility verifier is operable to determine that the first field-programmable unit code is compatible with the computer system if a combination of the first field-programmable unit code and the plurality of field-programmable unit codes is among the plurality of compatible combinations of field-programmable unit codes identified by the first revision compatibility descriptor.

* * * * *

UNITED STATES PATENT AND TRADEMARK OFFICE
CERTIFICATE OF CORRECTION

| | | |
|---|---|---|
| PATENT NO. | : 7,725,892 B2 | Page 1 of 1 |
| APPLICATION NO. | : 10/610657 | |
| DATED | : May 25, 2010 | |
| INVENTOR(S) | : Daniel V. Zilavy et al. | |

It is certified that error appears in the above-identified patent and that said Letters Patent is hereby corrected as shown below:

In column 13, line 63, in Claim 6, delete "(A)" and insert -- (C) --, therefor.

Signed and Sealed this

Fourteenth Day of September, 2010

David J. Kappos
*Director of the United States Patent and Trademark Office*